United States Patent
Haq

(10) Patent No.: US 8,899,912 B2
(45) Date of Patent: Dec. 2, 2014

(54) SHAFT SEAL WITH CONVERGENT NOZZLE

(75) Inventor: Inam Ul Haq, Allegany, NY (US)

(73) Assignee: Dresser-Rand Company, Olean, NY (US)

( * ) Notice: Subject to any disclaimer, the term of this patent is extended or adjusted under 35 U.S.C. 154(b) by 685 days.

(21) Appl. No.: 13/142,578

(22) PCT Filed: Jan. 15, 2010

(86) PCT No.: PCT/US2010/021218
§ 371 (c)(1),
(2), (4) Date: Sep. 14, 2011

(87) PCT Pub. No.: WO2010/083427
PCT Pub. Date: Jul. 22, 2010

(65) Prior Publication Data
US 2012/0003088 A1    Jan. 5, 2012

Related U.S. Application Data

(60) Provisional application No. 61/144,902, filed on Jan. 15, 2009.

(51) Int. Cl.
| | |
|---|---|
| *F01D 11/04* | (2006.01) |
| *F04D 29/10* | (2006.01) |
| *F16J 15/40* | (2006.01) |
| *F01D 11/02* | (2006.01) |

(52) U.S. Cl.
CPC ........ *F01D 11/025* (2013.01); *F05D 2250/323* (2013.01); *F05D 2240/55* (2013.01); *F01D 11/04* (2013.01); *F16J 15/406* (2013.01)
USPC .......................... 415/112; 415/230

(58) Field of Classification Search
CPC ..... F04D 29/10; F04D 29/102; F04D 29/104; F01D 25/183

USPC ............. 415/110, 111, 112, 230, 168.2; 277/304, 927, 3, 70, 431
See application file for complete search history.

(56) References Cited

U.S. PATENT DOCUMENTS

| 3,420,434 A | 1/1969 | Swearingen |
|---|---|---|
| 3,517,821 A | 6/1970 | Monson |

(Continued)

FOREIGN PATENT DOCUMENTS

| JP | 8284961 | 11/1996 |
|---|---|---|
| JP | H08284961 | 11/1996 |
| WO | 2010083427 | 7/2010 |

OTHER PUBLICATIONS

International Application No. PCT/US2010/021218—Notification of Transmittal of International Search Report and Written Opinion dated Mar. 23, 2010.

(Continued)

*Primary Examiner* — Edward Look
*Assistant Examiner* — Michael Sehn
(74) *Attorney, Agent, or Firm* — Edmonds & Nolte, PC

(57) ABSTRACT

A turbomachine is disclosed that has a main fluid flowpath extending axially along the turbomachine with a rotating shaft partly enclosed in a casing, wherein the rotating shaft and casing are moveable relative to each other and define a clearance opening about the rotating shaft, whereby the main fluid flowpath fluidly communicates with an outside region, and an annular seal body defining a fluid passage having a primary fluid inlet configured to receive a pressurized fluid, a fluid outlet disposed proximate to the clearance opening, and a convergent chamber interposed therebetween, wherein the convergent chamber is configured to accelerate the pressurized fluid out of the fluid outlet so as to create a local reduced pressure at the clearance opening.

15 Claims, 2 Drawing Sheets

FIG.3

(56) References Cited

U.S. PATENT DOCUMENTS

| | | | |
|---|---|---|---|
| 3,645,544 A * | 2/1972 | Unsworth et al. | 277/431 |
| 3,804,423 A * | 4/1974 | Booy | 277/304 |
| 3,975,123 A | 8/1976 | Schibbye | |
| 4,078,809 A * | 3/1978 | Garrick et al. | 277/304 |
| 4,257,617 A * | 3/1981 | Hill | 277/304 |
| 4,477,223 A | 10/1984 | Giroux | |
| 4,752,185 A | 6/1988 | Butler et al. | |
| 5,129,930 A | 7/1992 | Gauthier et al. | |
| 5,641,280 A | 6/1997 | Timuska | |
| 6,145,844 A | 11/2000 | Waggott | |
| 6,330,790 B1 * | 12/2001 | Arora et al. | 60/39.08 |
| 6,514,322 B2 | 2/2003 | West | |
| 6,540,917 B1 | 4/2003 | Rachels et al. | |
| 6,935,831 B2 * | 8/2005 | Joshi | 415/1 |

OTHER PUBLICATIONS

International Application No. PCT/US2010/021218—Notification of Transmittal of International Preliminary Report on Patentability mailed Feb. 2, 2011.

* cited by examiner

SHAFT SEAL WITH CONVERGENT NOZZLE

CROSS-REFERENCE TO RELATED APPLICATIONS

This application claims priority to PCT International Patent Application No. PCT/US10/21218, which was filed on Jan. 15, 2010 and which claims priority to U.S. Patent Application Ser. No. 61/144,902 filed Jan. 15, 2009. These priority applications are hereby incorporated by reference in their entirety into the present application.

BACKGROUND

Sealing assemblies for turbomachines are generally located on both ends of a rotating shaft that is journalled with bearings. The sealing assemblies are used to prevent leakage into the atmosphere of process gas from a defined flow path through clearance openings formed between the rotating shaft and the turbomachine housing. Effectively sealing the process gas not only increases turbomachine efficiency, but in certain operations involving toxic or explosive gas under pressure, it also prevents dangerous gases from reaching the surrounding area and thereby causing volatile and possibly dangerous situations.

A typical sealing assembly may consist of a series of labyrinth seals and gas/oil seals axially spaced along the rotating shaft. Since each seal consumes a portion of axial shaft length, the centerline distance between the bearings is predictably increased, thus resulting in a longer and a heavier rotating shaft. Although all shafts deflect during rotation, an unnecessary increase in shaft length and weight can adversely affect shaft rotordynamics. For example, an increase in shaft length may lower the natural frequency of a shaft, thus resulting in higher potential amplitudes. Moreover, lower natural frequencies generally result in reduced critical speeds, and thus a less effective turbomachine.

SUMMARY

Embodiments of the disclosure may provide a sealing device configured to form a seal between a rotating shaft and a casing of a turbomachine. The sealing device may include a seal body disposed within the casing and defining a fluid passage having a primary fluid inlet configured to receive a pressurized fluid, and a fluid outlet defined by the seal body and communicably coupled to the fluid passage and in fluid communication with an inner-region of the casing. The seal device may also include a convergent chamber interposed between the primary fluid inlet and the fluid outlet, wherein the convergent chamber is configured to accelerate the pressurized fluid out of the fluid outlet so as to create a local reduced pressure within the inner-region of the casing.

Embodiments of the disclosure may further provide a turbomachine. The turbo machine may include a main fluid flowpath extending axially along the turbomachine, and a rotating shaft partly enclosed in a casing, wherein the rotating shaft and casing are moveable relative to each other and define a clearance opening about the rotating shaft. The turbomachine may also include a fluid passage defined in the casing and having a primary fluid inlet configured to receive a pressurized fluid, and also having a fluid outlet disposed proximate the clearance opening, and a convergent chamber interposed between the primary fluid inlet and the fluid outlet, the convergent chamber being configured to accelerate the pressurized fluid out the fluid outlet so as to create a local reduced pressure in the main fluid flowpath adjacent the clearance opening.

Embodiments of the disclosure may further provide a method of sealing a rotating shaft partly disposed in a casing, wherein the rotating shaft and the casing define a clearance opening that fluidly communicates an inner-region of the casing to an outside region. The method may include injecting a pressurized fluid into a seal body defining a fluid passage, receiving the pressurized fluid in a primary fluid inlet defined by the seal body, and accelerating the pressurized fluid in a convergent chamber fluidly coupled to the primary fluid inlet. The method may also include discharging the pressurized fluid out a fluid outlet fluidly coupled to the convergent chamber, wherein the fluid outlet is disposed proximate to the clearance opening, generating a local reduced pressure within the inner-region of the casing, and entraining a secondary fluid flow through the clearance opening from the outside region.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
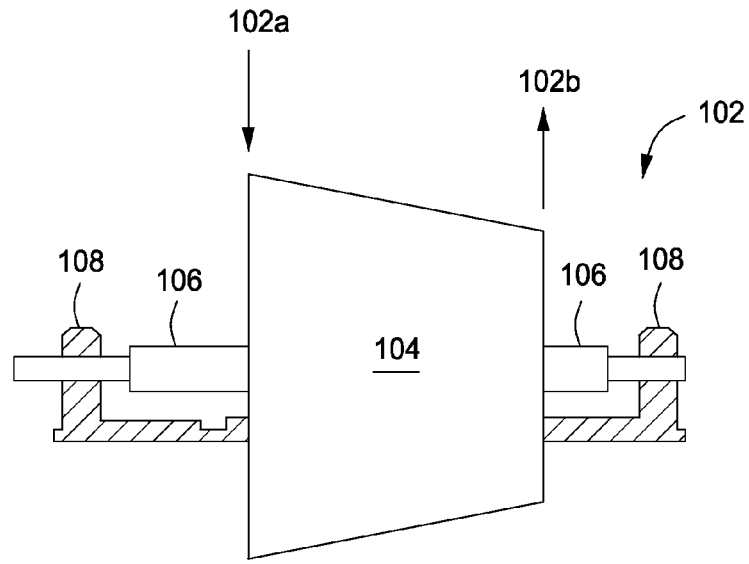
FIG. 1 is a schematic view an exemplary turbomachine according to one or more aspects of the present disclosure.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope.

The present disclosure generally relates to a shaft seal, in particular, a non-contacting convergent nozzle seal configured to reduce the number of labyrinth and gas/oil seals necessary to seal a turbomachine shaft. With a decrease in labyrinth and gas/oil seals, the shaft length may be shortened, resulting in a lighter and more rigid shaft. A shorter and more rigid shaft may increase the critical speed of the shaft and make the shaft less prone to rotor instability, including shaft vibration. Such increases may result in an overall increased speed and discharge pressure, thus an increase in turbomachine efficiency. Furthermore, as it is used in the claims or specification, the term "or" is intended to encompass both exclusive and inclusive cases, i.e., "A or B" is intended to be synonymous with "at least one of A and B," unless otherwise expressly specified herein.

Referring now to the drawings in detail, wherein like numbers are used to indicate like elements throughout, there is shown in FIG. 1 an exemplary turbomachine 102 according to one or more aspects of the present disclosure. In an exemplary embodiment, the turbomachine 102 may include a high-pressure turbo-compressor having a casing 104 with a low-pressure gas entry side 102a and a high-pressure gas exit side 102b. The casing 104 may include any stationary structure configured to house or encase the inner-workings of the turbomachine 102. The turbomachine 102 may also include a rotating shaft 106 configured to extend through the turbomachine 102 and exit both ends of the casing 104 where it may be journalled at each end with suitable bearings 108 as known in the art.

Figure 2:
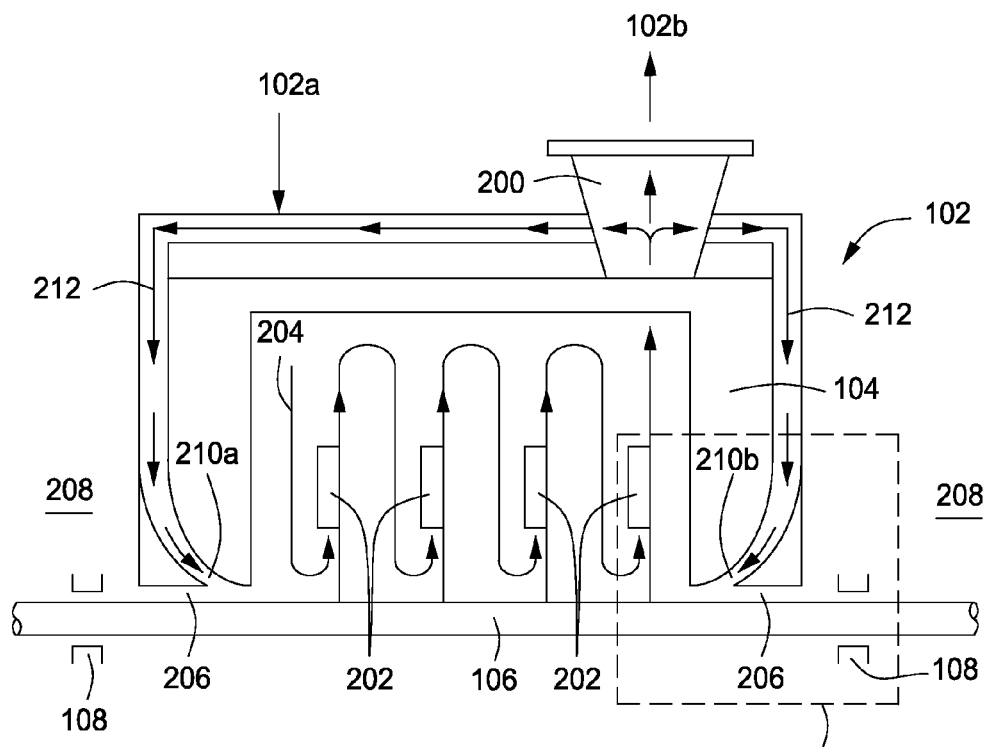
FIG. 2 is a schematic cross-section view through a portion of an exemplary turbomachine according to one or more aspects of the present disclosure.

Referring to FIG. 2, illustrated is a side-view schematic of the turbomachine 102, according to one or more aspects of the present disclosure. As described above, the rotating shaft 106 may pass through and extend out each end of the casing 104, and be appropriately journalled at each end by one or more bearings 108. The casing 104 may also include a discharge nozzle 200. The rotating shaft 106 may be operably coupled to a plurality of impellers 202 configured to sequentially compress a process gas in the direction of the main fluid flowpath 204. In exemplary operation, the process gas enters the main fluid flowpath 204 through the low-pressure gas entry side 102a and is thereafter compressed through the plurality impellers 202 before being discharged from the casing 104 as a pressurized process gas via the discharge nozzle 200.

As illustrated, a clearance opening 206 may be defined between the casing 104 and the rotating shaft 106. The opening 206 may be configured to allow the shaft 106 to rotate during normal operation. As shown, the clearance 206 may provide fluid communication between the main fluid flowpath 204 and an outside region 208. In an exemplary embodiment, the outside region 208 may include the atmosphere, but may in other embodiments include a separate, inner-stage of the turbomachine 102. Unless effectively sealed, the clearance opening 206 will allow pressurized process gas to escape from the main fluid flowpath 204 to the outside region 208, thereby resulting in a loss of operating efficiency.

In one embodiment, the pressurized process gas may be sealed into the main fluid flowpath 204 by at least two convergent nozzles 210a, 210b. Briefly, a convergent nozzle, also known as an ejector, can be designed to entrain fluids in a high velocity jet of propelling fluid. In operation, the convergent nozzle may be capable of converting a high-pressure, low-velocity fluid flow into a low-pressure, high-velocity fluid flow capable of entraining a secondary fluid flow. As can be appreciated, the higher the velocity of the jet from the nozzle, the greater the vacuum created and pressure against which the nozzle can exhaust.

In the illustrated embodiment, the convergent nozzles 210a, 210b may be operably coupled to each end of the casing 104, and may circumferentially extend around the shaft 106. In other embodiments, the convergent nozzles 210a, 210b may be cast or integrally formed into the casing 104 itself. In operation, the convergent nozzles 210a, 210b may be configured to prevent the pressurized process gas from escaping the main fluid flowpath 204 through the clearance openings 206, and thereby leaking into the outside region 208.

Figure 3:
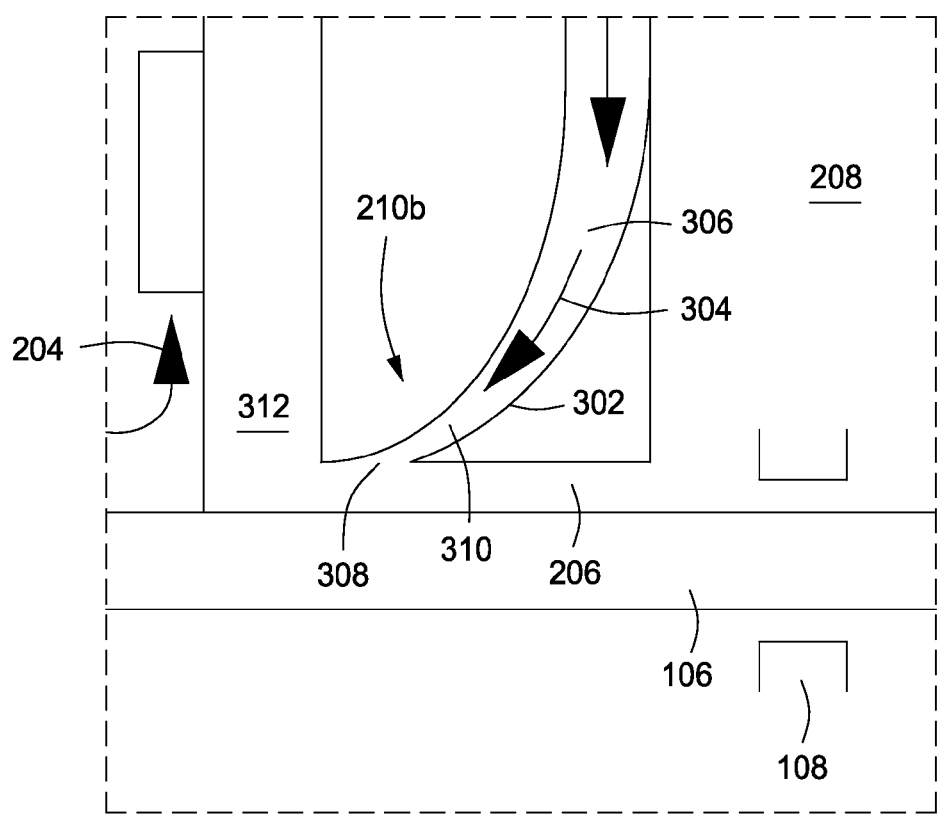
FIG. 3 is an enlarged scale detail view of the dashed area "FIG. 3" from FIG. 2 and illustrating a convergent nozzle according to one embodiment of the present disclosure.

Referring now to FIG. 3, an exemplary convergent nozzle 210b is shown according to one or more aspects of the present disclosure. As can be appreciated, the following description may correspond and be equally applied to the opposing convergent nozzle 210a. The convergent nozzle 210b may include a body 302 having a primary fluid passage 304 configured to receive, channel, and discharge a primary fluid. In at least one embodiment, the primary fluid may include a pressurized fluid. The body 302 may include a primary fluid inlet 306, a fluid outlet 308, and a convergent chamber 310 interposed between the inlet 306 and the outlet 308. The fluid outlet 308 may extend circumferentially around the rotating shaft 106 so as to be substantially adjacent the clearance opening 206.

During operation, a pressurized primary fluid entering the primary fluid inlet 306 may be accelerated through the convergent chamber 310 and discharged at a high velocity through the outlet 308 and into an adjacent inner-region 312. Accelerating the primary fluid may generate a local reduced pressure, or vacuum effect, in the inner-region 312, thereby entraining or drawing-in a flow of secondary fluid from the outside region 208 through the clearance opening 206. Accordingly, the interaction at the inner-region 312 of the high-velocity, low pressure primary fluid with an influx of a secondary fluid from the outside region 208 may generate a non-contacting, continuous sealing effect at the clearance opening 206. This sealing effect may, therefore, prevent process gas leakage from the main fluid flowpath 204 into the outside region 208.

In one or more embodiments, at least one adjustable valve or restrictor (not shown) may be used to adjust the mass-flow rate of the primary fluid through the convergent nozzles 210a, 210b. By adjusting the mass-flow rate of the primary fluid, the influx of secondary fluid into the inner-region 312 may be regulated even to a point of achieving pressure equilibrium where no fluid enters or leaves the casing 104. Therefore, a continuous fluid seal may be created and optimized for operation.

In one or more embodiments, a control system (not shown) may be communicably coupled to the adjustable valve or restrictor and configured to automate the regulation of the mass-flow rate of the primary fluid entering the converging nozzles 210a, 210b. The control system may be communicably coupled to at least one sensor arranged in the inner-region 312. The sensor may be capable of detecting environmental conditions therein and relaying such conditions back to the control system for processing. For example, a higher pressure detected in the main fluid flowpath 204 may result in a command to the control system to adjust the valve in order to increase the mass-flow rate of the primary fluid. Likewise, a lower pressure detected in the main fluid flow path 204 may result in a command to the control system to adjust the valve in order to decrease the mass-flow rate of the primary fluid. As can be appreciated, adjusting the mass-flow rate of the primary fluid may be used to establish a point of pressure equilibrium where no fluid enters or leaves the casing 104 through the clearance openings 206.

Referring again to FIG. 2, in an exemplary embodiment, the primary fluid channeled into the convergent nozzles 210a, 210b may originate, at least in part, from the discharge nozzle 200. As illustrated, one or more supply pipes 212 may fluidly communicate the discharge nozzle 200 to the convergent nozzles 210a, 210b, thereby exploiting the exiting high pressure process gas. In another embodiment, the primary fluid flow may originate from an alternative source, for example, an intermediate compressor stage of the machine 102 or an upstream turbine stage. In yet other embodiments, especially relevant during turbomachine 102 startup when process gas pressures tend to be low, the primary fluid may originate from a secondary or booster compressor (not shown). The booster compressor may be configured to either maintain the required pressure throughout turbomachine 102 operation, or discontinue after the turbomachine 102 reaches pressures sufficient to independently supply the primary fluid to the nozzles 210a, 210b.

In at least one embodiment, the present disclosure may provide a convergent nozzle seal applied to a turbomachine 102 and configured to seal the fluid flowing in a main fluid flowpath 204, thus preventing any leakage from such main fluid flowpath 204. Employing the convergent nozzle seal may render labyrinth and gas/oil seals unnecessary along the shaft 106 of the turbomachine 102. By eliminating these excess seals, the shaft 106 length and weight may be reduced, thereby increasing the critical speed of the shaft 106 and allowing the turbomachine 102 to deliver higher pressures more efficiently. Moreover, another possible improvement resulting from the present disclosure may include the ability to maintain larger clearances between the rotating and stationary members of a turbomachine.

In another embodiment, the present disclosure may be applied to a turbomachine with a back-to-back configuration. The dominant component affecting rotordynamics in a back-to-back configuration is a damper seal, typically located at the division wall between the two sections where shaft deflection is the greatest. In light of the length and weight of the rotating shaft in back-to-back turbomachines, the damper seal is generally configured to improve rotordynamic stability, particularly shaft vibration, and reduce section-to-section process gas leakage. According to embodiments of the disclosure, the shaft in a back-to-back configuration turbomachine may be significantly shortened by using at least one convergent nozzle seal at the shaft ends, as described above. Furthermore, in at least one embodiment, a convergent nozzle seal as generally described above may be used to replace the damper seal at the middle of the shaft. Each convergent nozzle seal in the back-to-back configuration may be regulated by an adjustable valve or restrictor controlled either directly or remotely by a control system, as described above.

In another exemplary embodiment, the present disclosure may be used in conjunction with a steam turbine turbomachine. In particular, at least one convergent nozzle seal may be implemented at the steam inlet end and the steam exhaust end of an exemplary steam turbine. Use of the at least one exemplary convergent nozzle seal may potentially supplement or replace labyrinth seals normally used to seal the process gas at the shaft ends. By replacing these seals with a convergent nozzle configuration, the shaft length may be decreased, thereby increasing the potential speed and efficiency of the machine.

In another exemplary embodiment the convergent nozzle seals of the present disclosure may be used in conjunction with an axial flow compressor, or a power turbine. In particular, at least one exemplary convergent nozzle seal may serve to replace the typical balance piston seal located near the shaft end of the axial flow compressor or the power turbine. Furthermore, at least one exemplary convergent nozzle seal may supplement or completely replace the shaft-end seals used on axial flow compressors and power turbines.

As can be appreciated by those skilled in the art, the present disclosure may be employed in numerous other applications not particularly disclosed herein. For example, convergent nozzle seals may be used to seal rotating shafts in a variety of turbomachine applications, including, steam turbines, gas turbines, compressors, separators, and expanders, each of which employ any number of shaft seals. Furthermore, the present disclosure may be employed on the overhang-type turbomachine that will typically employ only one convergent nozzle.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A shaft sealing device configured to form a seal between a rotating shaft and a casing of a turbomachine, comprising:
   an annular seal body disposed within the casing adjacent the rotating shaft and extending thereabout, the annular seal body defining a fluid passage having a primary fluid inlet configured to receive a pressurized fluid;
   a fluid outlet defined by the annular seal body and communicably coupled to the fluid passage, the fluid outlet being in fluid communication with an inner-region of the casing; and
   a convergent chamber interposed between the primary fluid inlet and the fluid outlet, the convergent chamber being configured to accelerate the pressurized fluid out of the fluid outlet with an axial flow component so as to create a local reduced pressure within the inner-region of the casing, wherein,
   the rotating shaft and the casing are moveable relative to each other and define a clearance opening that provides fluid communication between the inner-region of the casing and an outside region; and
   the local reduced pressure entrains a flow of a secondary fluid from the outside region through the clearance opening and into the inner-region.

2. The shaft sealing device of claim 1, wherein the outside region is the atmosphere.

3. The shaft sealing device of claim 1, further comprising an adjustable valve configured to manipulate a mass-flow rate of the pressurized fluid through the fluid passage to locate a pressure equilibrium between the inner-region and the outside region.

4. The shaft sealing device of claim 1, wherein the fluid passage of the annular seal body is configured to receive the pressurized fluid from a discharge nozzle of the casing.

5. The shaft sealing device of claim 1, wherein the fluid passage of the annular seal body is configured to receive the pressurized fluid from a booster compressor.

6. A turbomachine, comprising:
   a main fluid flowpath extending axially along the turbomachine;
   a casing having a rotating shaft extending therethrough, the casing and the rotating shaft being moveable relative to each other and defining a clearance opening about the rotating shaft;
   a fluid passage defined in the casing and having a primary fluid inlet and a fluid outlet, the primary fluid inlet being configured to receive a pressurized fluid and the fluid outlet being disposed adjacent the rotating shaft proximate the clearance opening, wherein the fluid outlet is in fluid communication with an inner-region of the casing and extends circumferentially about the rotating shaft; and
   a convergent chamber interposed between the primary fluid inlet and the fluid outlet, the convergent chamber being configured to accelerate the pressurized fluid out the fluid outlet with an axial flow component so as to create a local reduced pressure within the inner-region of the casing, and wherein the local reduced pressure entrains a flow of a secondary fluid from an outside region to the inner-region through the clearance opening.

7. The turbomachine of claim 6, wherein the outside region comprises the atmosphere.

8. The turbomachine of claim 6, wherein the outside region comprises an inner-stage of the turbomachine.

9. The turbomachine of claim 6, further comprising an adjustable valve arranged in the fluid passage and configured to manipulate a mass-flow rate of the pressurized fluid through the fluid passage.

10. The turbomachine of claim 6, wherein the casing further comprises a discharge nozzle fluidly coupled to the fluid passage and providing at least a portion of the pressurized fluid.

11. The turbomachine of claim 6, wherein the fluid passage is fluidly coupled to a booster compressor.

12. A method of sealing a rotating shaft partly disposed in a casing, wherein the rotating shaft and the casing define a clearance opening that fluidly communicates an inner-region of the casing to an outside region, comprising:
   injecting a pressurized fluid into an annular seal body fluidly coupled to a fluid passage defined in the casing, the annular seal body having a converging chamber defined therein;
   accelerating the pressurized fluid in the convergent chamber;
   discharging the pressurized fluid out a fluid outlet defined in the annular seal body and fluidly coupled to the convergent chamber, the fluid outlet being disposed proximate the clearance opening and extending circumferentially around the rotating shaft;
   generating a local reduced pressure within the inner-region of the casing; and
   entraining a secondary fluid flow from the outside region to the inner region through the clearance opening.

13. The method of claim 12, further comprising adjusting a mass-flow rate of the pressurized fluid through the annular seal body to achieve a pressure equilibrium between the inner-region and the outside region.

14. The method of claim 12, wherein the outside region comprises the atmosphere.

15. The method of claim 12, wherein the outside region comprises an inner-stage of the turbomachine.

* * * * *